(12) United States Patent
Ding et al.

(10) Patent No.: US 7,939,599 B2
(45) Date of Patent: May 10, 2011

(54) SUBSTANTIALLY COMPLETELY BIODEGRADABLE HIGH STARCH POLYMER

(75) Inventors: Chun Yang Ding, Beijing (CN); Yi Hua Zheng, Beijing (CN); Xian Zhang, Shanghai (CN)

(73) Assignees: Biostarch Technology PTE. Ltd, Singapore (SG); Beijing Jinbaodi Bio-Environmental Technology Ltd, Beijing (CN)

( * ) Notice: Subject to any disclaimer, the term of this patent is extended or adjusted under 35 U.S.C. 154(b) by 723 days.

(21) Appl. No.: 11/815,395

(22) PCT Filed: May 17, 2005

(86) PCT No.: PCT/IB2005/001326
§ 371 (c)(1),
(2), (4) Date: Nov. 7, 2007

(87) PCT Pub. No.: WO2006/082471
PCT Pub. Date: Aug. 10, 2006

(65) Prior Publication Data
US 2008/0153958 A1     Jun. 26, 2008

(30) Foreign Application Priority Data

Feb. 6, 2005  (CN) .......................... 2005 1 0007336

(51) Int. Cl.
*C04B 24/26* (2006.01)
*C08F 220/18* (2006.01)
*C08F 251/00* (2006.01)
*C08B 11/20* (2006.01)

(52) U.S. Cl. ........ 524/803; 524/804; 524/833; 524/842; 524/844

(58) Field of Classification Search ................. 524/803, 524/804, 833, 842, 844
See application file for complete search history.

(56) References Cited

U.S. PATENT DOCUMENTS
5,736,586 A * 4/1998 Bastioli et al. ............... 521/84.1

FOREIGN PATENT DOCUMENTS
| EP | 1038908 A1 | 9/2000 |
| WO | 9216583 A1 | 10/1992 |
| WO | 9412567 A1 | 6/1994 |
| WO | 9733934 A1 | 9/1997 |

* cited by examiner

*Primary Examiner* — William K Cheung
(74) *Attorney, Agent, or Firm* — Volpe and Koenig, P.C.

(57) ABSTRACT

This invention is a substantially completely biodegradable high starch polymer using completely biodegradable high polymer polyvinyl alcohol [PVOH] that is made to be compatible with starch. The two ingredients are mixed with the optional addition of elasticity enhancer and supplement agent to better the stability and durability of the products. During the mixing and heating process the starch molecular structures are randomized. The randomized starch molecules, the PVOH, the elasticity enhancer and the supplement then under go the process of co-polymerization. The mixture is then extruded, at a temperature that is above the crystallization temperature of the starch molecules, to form the first stage product, the pellets. The pellets can then be extruded into films using a traditional plastic film extruder.

20 Claims, No Drawings

SUBSTANTIALLY COMPLETELY BIODEGRADABLE HIGH STARCH POLYMER

THE INVENTION

This invention concerns:
a substantially completely biodegradable high starch polymer and its manufacturing method; and a high starch polymer film manufactured from the biodegradable polymer.

BACKGROUND

The use of plastics has brought much convenience to the world, but along with it also came plastic pollution. Much effort has been made in researching and producing environmentally friendly alternatives for plastics since the 1960's. In the 1970's the concept of biodegradable plastic was born. And today numerous types of biodegradable plastic films have made their ways into the market. However, the vast majority of the so-called biodegradable plastics are made of oil polymers (such as polyethylene plastics) with some degradable materials mixed into the film. Therefore the main component of these films is not biodegradable.

There is a small number of products currently available that are completely biodegradable but these products still have many deficiencies, such as poor water resistance, lack of strength and durability, and they are expensive to produce. These deficiencies have prevented large-scale commercialisation of the earlier model films.

THE INVENTION AND ITS PREFERRED FEATURES

The invention is intended to solve the above-mentioned technical deficiencies, so to provide the market with a substantially completely biodegradable high starch polymer film as an alternative to the traditional oil polymer plastics currently used in various applications. This invention provides the technology and the methodology of manufacturing a high starch polymer and high starch polymer films. The high starch polymer film made by this technology is substantially 100% degradable in the natural environment and it possesses many desirable features of the oil polymer plastic films, such as temperature resistance, durability and, to some extent, water resistance. In this invention the high starch polymer films can be made by using traditional plastic extrusion machines. As a result the manufacturing process is both cost efficient and energy efficient. The final products are inexpensive and therefore can be readily accepted by the current market.

This invention uses completely biodegradable high polymer polyvinyl alcohol [PVOH] that is made to be compatible with starch. The two ingredients are mixed with the optional addition of elasticity enhancer and supplement agent to better the stability and durability of the products. During the mixing and heating process the starch molecular structures are randomized. The randomized starch molecules, the PVOH, the elasticity enhancer and the supplement then under go the process of co-polymerization. The mixture is then extruded, at a temperature that is above the crystallization temperature of the starch molecules, to form the first stage product, the pellets. The pellets can then be extruded into films using a traditional plastic film extruder.

The high starch polymer contains starch, PVOH and elasticity enhancer in the following weight distribution proportions:

| | |
|---|---|
| [a] Starch | 10.0-20.0 |
| [b] PVOH | 5.0-13.3 |
| [c] Elasticity Enhancer | 3.3-13.3 |

The optimal weight distribution proportion is:

| | |
|---|---|
| [a] Starch | 10.0-14.0 |
| [b] PVOH | 5.3-10.0 |
| [c] Elasticity Enhancer | 5.0-7.5 |

If necessary, an additional supplement agent may be used in the making of the high starch polymer. The respective weight distribution proportion is:

| | |
|---|---|
| [a] Starch | 10.0-20.0 |
| [b] PVOH | 5.0-13.3 |
| [c] Elasticity Enhancer | 3.3-13.3 |
| [d] Supplement Agent | 0.3-2.0 |

The optimal weight distribution proportion is:

| | |
|---|---|
| [a] Starch | 10.0-14.0 |
| [b] PVOH | 5.3-10.3 |
| [c] Elasticity Enhancer | 5.0-7.5 |
| [d] Supplement Agent | 0.5-1.5 |

The starch used in this invention contains greater than 20% of amylose, such as maize starch, chemically modified starch and oxidized starch, or the mixture of all above.

The degree of alcoholysis of the PVOH used in this invention varies according to the types of films required. For example, the PVOH with alcoholysis of 88% may be used to produce films that are water-soluble. The PVOH with alcoholysis less than 50% may be used to produce films that are not water-soluble.

The optimal PVOH used in this invention has a polymerization index of greater than about 1000.

The elasticity enhancer used in this invention is made of a mixture of polyols, polyglycol and water, with the respective weight distribution proportion of [10.0-18.6]:[2.9-8.6]:[5.7-14.3]. The optimal polyols are glycol, propanediol, glycerol or sorbitol. The optimal polyglycol used in this invention has a molecule size of 200-600.

The supplement agent in this invention is made of Polyvinyl Alcohol [PVA], Ethylene Vinyl alcohol copolymer [EVOH], Ethylene Acrylic Acid [EAA] and Poly Methyl Methacrylate [PMMA]. Their respective weights in percentage are PVA 20-30%, EVOH 18-29%, EAA 17-28% and PMMA 15-35%. The optimal percentage is PVA 23-28%, EVOH 21-25 &, EAA 21-26% and PMMA 22-28%.

The method of manufacturing the substantially 100% biodegradable high starch polymer film:
[a] Add the correct portions of starch and PVOH in a mixer and stir for 3-5 minutes at a temperature range between 40° C.-80° C.;
[b] Slowly add the elasticity enhancer and stir thoroughly for 5-15 minutes;
[c] The mixture is extruded into pellets in a specially designed extruder at the temperature range of between 110° C.-160° C.; and

[d] The pellets are fed into a traditional plastic film extruder to make the film.

Starch undergoes sudden breakdown at the high temperature. Due to the high starch content the mixture must not remain in high temperature, say between 120° C.-200° C., for more than 4-8 minutes.

Terms used in this document: unless otherwise specified, all portions and ratios and percentages used in this document are in weights.

PRACTICAL EXAMPLES

The following practical examples are designed to further illustrate the invention. The invention should not be viewed as being limited by these examples under any circumstances. It is to be understood that various alterations, modifications and or additions may be incorporated into the various constructions and arrangements of parts without departing from the spirit and ambit of the invention.

Examples of Manufacturing the Elasticity Enhancer

Formula One

Mix PVA, EVOH, EAA and PMMA in the ratio of 23.7%, 24.8%, 23.8% and 27.7% and stir for 8 minutes in a mixer. The mixture is then extruded at 140° C. in a twin-screw shaft extruder to produce the product.

Formula Two

Mix PVA, EVOH, EAA and PMMA in the ratio of 27%, 23%, 24% and 26% and stir for 7 minutes in a mixer. The mixture is then extruded at 155° C. in a twin-screw shaft extruder to produce the product.

Method of Manufacturing the Supplement Agent:

[1] Combine the PVA, EVOH, EAA and PMMA in the correct percentages as was described hereinabove, and then stir and mix for 5-10 minutes in a mixer.

[2] The mixture is then extruded in a twin-screw shaft extruder at the temperature range between 120-160° C. This process breaks down the original molecular structures of PVA, EVOH, EAA and PMMA and therefore permitting optimal co-polymerization of starch, PVOH and the ingredients of the supplement agent.

One Example of the Technical Specification of the Film:

At 0.04 mm thickness, the film's longitudinal stretching strength was measured at 30.50 Mpa and transverse stretching strength at 26.93 Mpa. The longitudinal stretch/break ratio was 152% and the transverse stretch/break ratio was 175%. The longitudinal perpendicular angle tearing strength was 49.91 N/mm and the transverse perpendicular angle tearing strength was 68.34 N/mm.

Five Actual Examples of Film Manufacturing and the Technical Specifications of the Films Example One Mix 12 portions of glycerol, 6 portions of polyglycol and 8 portions of water; stir till mixture is completely dissolved. This produces the elasticity enhancer. Mix 40 portions of maize starch and 30 portions of PVOH and stir thoroughly at 60° C. Whip at high speed for 3 minutes followed by whipping at a slower speed while the elasticity enhancer is being slowly added into the mixture. Once the process is complete the high-speed whipping is resumed for another 10 minutes. The resulting mixture is then extruded, with the shaft spinning speed of 45 Hz, in a single-screw shaft extruder to make the pellets. The various chambers of the extruder have temperatures of 110° C., 120° C., 130° C. and 130° C. The temperature of the head of the extruder is 120° C. The pellets are now ready to be made into films using traditional plastic film extruder. The plastic extruder's screw shaft temperature must be set at the range of 160° C.-200° C., the sieves mesh at 140° C.-170° C., the head of extruder at 160° C.-200° C. and the injection orifice at 130° C.-160° C. respectively.

At a thickness of 0.042 mm the film made using the described procedure was measured to have the following characteristics:

The longitudinal stretching strength was 31.77 Mpa.
The transverse stretching strength was 28.35 Mpa.
The longitudinal stretch/break ratio was 169%.
The transverse stretch/break ratio was 183%.
The longitudinal perpendicular angle tearing strength was 51.83 N/mm.
The transverse perpendicular angle tearing strength was 72.41 N/mm.

Example Two

Employing the same procedures as described previously but using the following proportions of raw materials:

| | |
|---|---|
| Maize starch: | 45 Portions |
| PVOH: | 28 Portions |
| Glycerol: | 12 Portions |
| Polyglycol: | 5 Portions |
| Water: | 10 Portions |

At a thickness of 0.038 mm the film has the following characteristics:

The longitudinal stretching strength was 37.70 Mpa.
The transverse stretching strength was 26.54 Mpa.
The longitudinal stretch/break ratio was 163%.
Transverse stretch/break ratio was 175%.
The longitudinal perpendicular angle tearing strength was 49.71 N/mm.
The transverse perpendicular angle tearing strength was 70.81 N/mm.

Example Three

Mix 9 portions of glycerol, 6 portions of polyglycol and 6 portions of water; stir until mixture is completely dissolved. The resulting product is the elasticity enhancer. Mix 48 portions of maize starch and 25 portions of PVOH and stir in a mixer at 60° C. Whip at high speed for 4 minutes followed by whipping at a slower speed while the elasticity enhance as well as 2 portions of supplement agent are being slowly added into the mixture. Once the process is complete the high-speed whipping is resumed for another 10 minutes. The resulting mixture is then extruded into pellets. The pellets are extruded into film using a conventional plastic film extruder.

At a thickness of 0.042 mm, the film made using the described procedure has the following characteristics:

The longitudinal stretching strength was 31.61 Mpa.
The transverse stretching strength was 28.29 Mpa.
The longitudinal stretch/break ratio was 168%.
The transverse stretch/break ratio was 180%.
The longitudinal perpendicular angle tearing strength was 50.48 N/mm.

The transverse perpendicular angle tearing strength was 72.27 N/mm.

Example Four

Employing the same procedures as described in Example Three but using the following portions of raw materials:

| | |
|---|---|
| Maize starch: | 53 Portions |
| PVOH: | 22 Portions |
| Glycerol: | 11 Portions |
| Polyglycol: | 6 Portions |
| Water: | 8 Portions |
| Supplement agent: | 4 Portions |

At a thickness of 0.04 mm the film has the following characteristics:
The longitudinal stretching strength was 27.90 Mpa.
The transverse stretching strength was 26.46 Mpa.
The longitudinal stretch/break ratio was 142%.
The transverse stretch/break ratio was 173%.
The longitudinal perpendicular angle tearing strength was 49.37 N/mm.
The transverse perpendicular angle tearing strength was 64.24 N/mm.

Example Five

| | |
|---|---|
| Maize starch: | 35 Portions |
| Oxidised starch | 20 |
| PVOH: | 20 Portions |
| Glycerol: | 11 Portions |
| Polyglycol: | 6 Portions |
| Water: | 8 Portions |
| Supplement agent: | 4 Portions |

At a thickness of 0.038 mm the film has the following characteristics:
The longitudinal stretching strength was 24.50 Mpa.
The transverse stretching strength was 24.23 Mpa.
The longitudinal stretch/break ratio was 118%.
The transverse stretch/break ratio was 165%.
The longitudinal perpendicular angle tearing strength was 48.18 N/mm.
The transverse perpendicular angle tearing strength was 61.95 N/mm.

The Merits of this Invention:

[a] The product of this invention has high starch content so it is cost efficient. The inexpensiveness of the product makes it easy for large-scale commercialization.

[b] The film manufactured using the method of this invention has comparable strength, tearing resistance and puncture resistance to that of traditional polyester film. It is a suitable alternative and substitute for oil polymer plastic film and can be used in a wide range of domestic and commercial applications. It is 100% biodegradable in a natural environment in a very short period of time. It dissolves in hot water almost immediately. It does not dissolve in cold water. The biodegradability can be confirmed by a "Cellulase Test".

[c] The manufacturing process in this invention employs relatively simple technology. It does not require capital-intensive equipment. The high starch polymer film can be made by using conventional plastic film extruders. The entire operation is cost-effective and makes the large-scale industrial production readily feasible.

The invention claimed is:

1. A substantially completely biodegradable high starch polymer comprising polyvinyl alcohol [PVOH], starch and an elasticity enhancer made of a mixture of polyols, polyglycol and water with respective weight distribution proportion of the polyols, polyglycol and water of [10.0-18.6]; [2.9-8.6]; [5.7-14.3].

2. A polymer according to claim 1 in which the starch contains greater than 20% amylose.

3. A polymer according to claim 2 in which the starch is selected from the group consisting of maize starch, chemically modified starch and oxidized starch, or mixtures thereof.

4. A polymer according to claim 3 in which the PVOH has a polymerization index of greater than 1000.

5. A polymer according to claim 1 in which the polyols are selected from the group consisting of glycol, propanediol, glycerol and sorbitol, or mixtures thereof.

6. A polymer according to claim 1 in which the polyglycol has a molecule size of 200-600.

7. A substantially completely biodegradable high starch polymer comprising polyvinyl alcohol [PVOH], starch, and a supplement agent comprising a mixture of Polyvinyl Alcohol [PVA], Ethylene Vinyl alcohol copolymer [EVOH], Ethylene Acrylic Acid [EAA] copolymer and Poly Methyl Methacrylate [PMMA].

8. A polymer according to claim 7 in which the supplement agent has the respective weight in percentage of PVA 20-30%, EVOH 18-29%, EAA 17-28% and PMMA 15-35%.

9. A polymer according to claim 8 in which the supplement agent has the respective weight in percentage of PVA 23-28%, EVOH 21-25%, EAA 21-26% and PMMA 22-28%.

10. A polymer according to claim 1 containing starch, PVOH and elasticity enhancer in the following weight distribution proportions:
   [a] Starch 10.0-20.0
   [b] PVOH 5.0-13.3
   [c] Elasticity Enhancer 3.3-13.3.

11. A polymer according to claim 10 in which the elasticity enhancer is in the weight distribution proportion of 5.0-7.5.

12. A polymer according to claim 9 containing starch, PVOH, elasticity enhancer and supplement agent in the following weight distribution proportions:
   [a] Starch 10.0-20.0
   [b] PVOH 5.0-13.3
   [c] Elasticity Enhancer 3.3-13.3
   [d] Supplement Agent 0.3-2.0.

13. A polymer according to claim 12 in which the supplement agent is in the weight distribution proportion of 0.5-1.5.

14. A polymer according to claim 1 for the production of water-soluble films in which the PVOH in the polymer has an alcoholysis of about 88%.

15. A polymer according to claim 1 for the production of non-water-soluble films in which the PVOH in the polymer has an alcoholysis of less than, about 50%.

16. A method for manufacturing a substantially completely biodegradable high starch polymer comprising the steps:
   [a] mixing starch and PVOH;
   [b] heating with mixing to randomise the molecular structures of the starch and allowing the randomized starch and PVOH to undergo polymerization;
   [c] extruding the mixture into pellets at a temperature that is above the crystallization temperature of the starch molecules;

[d] adding starch and PVOH to a mixer and stir for 3-5 minutes at a temperature range between 40° C.-80° C.;

[e] slowly adding elasticity enhancer and stirring thoroughly for 5-15 minutes; and

[f] extruding the mixture into pellets in an extruder at a temperature range of between 110° C.-160° C.

17. A method according to claim 16 with the step of adding a supplement agent to the mixture.

18. A method according to claim 16 in which the mixture does not remain at a temperature of between 120° C.-200° C. for more than about 4-8 minutes.

19. A made from a polymer according to claim 1.

20. A film made from a polymer manufactured according to claim 16.

* * * * *